United States Patent
Mizata et al.

[11] Patent Number: 6,155,651
[45] Date of Patent: Dec. 5, 2000

[54] BICYCLE SPOKE RIM WHEEL FOR TUBELESS TIRE

[75] Inventors: Shuich Mizata, Gifu-ken; Fuyuhiro Tunekuni, Miyagi-ken; Masaki Hashimoto; Yasuo Ako, both of Osaka, all of Japan

[73] Assignees: INOAC Elastomer Co. Ltd., Ibi-gun; Araya Industrial Co., Ltd., Osaka; INOAC Corporation, Aichi, all of Japan

[21] Appl. No.: 09/302,186

[22] Filed: Apr. 30, 1999

[30] Foreign Application Priority Data

Aug. 8, 1998 [JP] Japan .................................. 10-245831

[51] Int. Cl.$^7$ .............................. B60B 21/00; B60B 21/02
[52] U.S. Cl. .......................... 301/95; 152/381.6; 152/427
[58] Field of Search ................................. 301/95, 96, 97, 301/98, 58, 5.24; 152/381.6, 381.3, 381.5, DIG. 13, 429; 29/894.341

[56] References Cited

U.S. PATENT DOCUMENTS

| | | | |
|---|---|---|---|
| 1,820,857 | 8/1931 | Wilson | 152/381.3 |
| 2,029,132 | 1/1936 | Skelton | 301/97 |
| 2,128,322 | 8/1938 | Riehl | 152/381.6 |
| 3,008,770 | 11/1961 | Mueller | 301/97 |
| 4,165,776 | 8/1979 | Marvy | 152/381.1 |
| 4,305,622 | 12/1981 | Mitchell | 301/58 |
| 4,448,456 | 5/1984 | Pfundstein | 301/58 |
| 4,602,665 | 7/1986 | Sacks | 301/97 |
| 4,824,177 | 4/1989 | Aloy | 301/58 |
| 4,850,411 | 7/1989 | Seitz et al. | 301/95 |
| 5,000,241 | 3/1991 | Patecell | 152/381.5 |
| 5,249,846 | 10/1993 | Martin et al. | 301/95 |
| 5,538,058 | 7/1996 | Aloy | 152/381.5 |
| 5,769,584 | 6/1998 | Claes | 301/58 |
| 5,931,544 | 8/1999 | Dietrich | 301/58 |
| 5,988,764 | 11/1999 | Deetz | 301/95 |
| 6,019,149 | 2/2000 | Stringer | 301/97 |

*Primary Examiner*—S. Joseph Morano
*Assistant Examiner*—Long B. Nguyen
*Attorney, Agent, or Firm*—Armstrong, Westerman, Hattori, McLeland & Naughton

[57] ABSTRACT

A bicycle spoke rim wheel for a WO type tubeless tire is disclosed having a rim construction which can secure an airtightness, reduce a weight of the wheel, and easily fit a tire. Particularly, a seal material within a recess can be reduced in weight, and mounting of a tire bead on the rim is facilitated by placing the tire bead into the recess. This provides an arrangement, wherein a rim (1) is provided with a diaphragm (5) on a rim outer side (3), a nipple hole (20) of the diaphragm (5) is airtightened by a seal material (24) in the form of a metal tape and, when air is filled into a tubeless tire (37), a soft foam (25) is further bonded to the upper surface of the seal material (24) so that a tire bead portion (38) is readily placed on a bead-seating portion (11), whereby even a thin tire bead portion (38) can be easily sealed, as a result of which the shape of the bead-seating portion from a rim ear portion (7) to a hump portion (12) is curved to enlarge a sealing area, a valve (29) is pressed against the diaphragm (5) through a packing (34) and airtightened, a spoke mounting-hole (23) is bored in thick-wall portion of the rim body surface (18), and a spoke end (28) and a nipple head (26) are received in a hollow portion (8).

3 Claims, 6 Drawing Sheets

BICYCLE SPOKE RIM WHEEL FOR TUBELESS TIRE

TECHNICAL FIELD

The present invention relates to a bicycle spoke rim wheel having spokes extended between a rim and a hub, and particularly to a spoke rim wheel for a bicycle on which a tubeless tire can be mounted.

BACKGROUND OF THE INVENTION

In general, the spoke rim wheel for a bicycle comprises an annular rim for holding a tire, a hub located in the center of the rim to hold the rim on a wheel, and spokes for connecting the rim and the hub. The spoke is inserted into a mounting hole bored in a flange portion of the hub. A head of the spoke is placed in engagement with the mounting hole, and an end with a thread tapped is threadedly mounted by a nipple inserted into a through-hole bored in a zigzag manner in a peripheral direction of the rim from the outer side of the rim, that is, from the side on which a tire is put to apply tension to the spoke. Therefore, the through-hole of the rim has no airtightness at all, and, since the head of the nipple and the end of the spoke project on the outer side of the rim, it is impossible to make use of the tubeless tire on the spoke rim wheel.

Some constructions in which a tubeless tire is used are disclosed in Japanese Utility Model Application Laid-Open Nos. S50-134857, S50-134858, and S51-156147 Publications. In these constructions, spoke-mounting tongues are provided over the entire periphery on the inner side of the rim; that is, on the spoke-mounting side, the tongues being bored with spoke-inserting through-holes. However, these constructions are complicated, and besides, since tightening of spokes is done in a special way, the operation for applying tension to the spokes is cumbersome.

On the other hand, other constructions are disclosed in Japanese Utility Model Publication No. S35-29401 Publication and Japanese Utility Model Application Laid-Open No. S48-64903 Publication. In these constructions, airtightness means using a special seal material is employed in order to close through-holes into which spokes are inserted, the holes being bored in a zigzag manner on the outer side of the rim. However, even if these seal materials are used, since the head of the nipple mounted on the rim or the end of the spoke comes in contact with the seal material, the head of the nipple or the end of the spoke pushes up or laterally moves the seal material due to complicated vibrations in all directions received during running, posing an inconvenience that the airtightness fails to hold due to the generation of breakage, deviation, peeling, and the like, of the seal material.

For overcoming such an inconvenience as described above, there is proposed means as disclosed in Japanese Patent Application Laid-Open No. H7-112601. This means is constructed such that a dovetailed tenon groove is provided in a rim, a rubber band is disposed in the groove, a protrusion internally projecting from the rim forms a bead seat of a tire 5, that is, a bead-seating portion, and a tire bead extends internally from the bead-seating portion of the rim so that the bead is partly supported on the upper surface of the rubber band disposed in the groove to press the rubber band so as to maintain the airtightness. The means disclosed in that publication has a construction capable of securing the airtightness. However, since the tire bead is partly supported on the upper surface of the rubber band provided in the groove, the tire bead need be widened. In addition, when the tire is fitted in the rim, the extreme end of the bead required to fit the tire cannot be temporarily moved into the groove because the groove is filled with the rubber band and the tire bead is wide, as described above, thus posing an inconvenience that the tire is difficult to mount on the rim, and the thick rubber band causes the weight of the wheel to increase.

The present invention is to solve the problem as noted above. The invention provides a bicycle spoke rim wheel for a tubeless tire of the wire-on type (so-called "WO Type"), in which airtightness can be maintained positively, the entire wheel can be reduced in weight, and mounting of tire on the rim can be done easily; and further, means is provided in which a seal material within a groove that is, a recess can be reduced in weight, and movement of a tire bead into the recess is enabled.

SUMMARY OF THE INVENTION

Technical means of the present invention taken to solve the problem noted above will be explained below:

(1) A diaphragm is provided on a rim, a nipple hole formed in the diaphragm is sealed by a tape-like seal material and airtightened;

(2) the tape-like seal material comprises a thin and flexible metal tape;

(3) a flexible foam is mounted on the metal tape so that a tire bead portion is easily placed on a bead-seating portion of the rim when air is filled in a tubeless tire;

(4) the shape of the rim from an ear portion to a hump portion of the bead-seated portion of the rim is curved to enlarge a sealing area in order to facilitate sealing even the tin (that is, narrow) tire bead;

(5) a pneumatic valve is pressed and airtightened against the diaphragm through a packing formed of an elastic rubber material or an elastic plastic material; and (6) a thick-wall portion of the rim-body surface is bored with a through-hole, and a spoke end and a nipple head are received into a hollow portion.

The foam used in the present invention is a foam formed of a rubber material or a plastic material, which has an elasticity and has a restoring force even if it is compressed, preferably a urethane resin foam.

According to a first aspect of the present invention, there is provided a bicycle spoke rim wheel for a tubeless tire of the wire-on type, the wheel comprising a spoke mounting wall 4 on a rim inner side 2, a diaphragm 5 on a rim outer side 3, left and right rim side walls 6, and left and right ear portions 7 standing upright from the rim side walls 6 toward the rim outer side 3, wherein an internal region surrounded by the diaphragm 5 on the rim outer side 3, the rim side walls 6, and the spoke mounting wall 4 on the inner side 2 is formed into a hollow portion 8. The diaphragm 5 on the rim outer side 3 has, in symmetry of a rim center 10, a bead-seating portion 11 extending substantially horizontally from left and right ear rising portions 9 toward a rim center 10, and a recess 13 recessed from a hump portion 12 closer to the rim center 10 of the bead-seating portion 11 to the spoke-mounting wall 4. A plurality of nipple holes 20 are peripherally equidistantly formed in the recess 13, the spoke-mounting wall 4 being formed with a spoke-mounting hole 23 in alignment with each nipple hole 20 and into which a nipple 21 and a spoke end 28 are inserted. A nipple head 26 is mounted on the spoke mounting wall 4 in the hollow portion 8 through the nipple hole 20 of the recess 13. A valve head 32 of a valve 29 for filling air into a tubeless tire 37 is disposed on the diaphragm 5 of the recess 13. The valve body 33 is inserted into a valve hole 31 formed in the spoke mounting wall 4, and a nut 36 is tightened. According to the invention a tape-like seal material 24 is pasted to the diaphragm 5 of the recess 13 to seal the nipple hole 20. A plate-like foam 25 having a width of substantially a bottom 15 of the recess 13 and a height substantially of the height of recess 13 is pasted on the tape-like seal material 24 of the recess 13. A packing 34 is disposed between the valve head 32 and the peripheral wall of the valve hole 30 of the recess 13 to press the valve head 32 against the diaphragm 5 of the recess 13 so as to make the valve hole 30 airtight.

According to a second aspect of the present invention, the bicycle spoke, rim wheel for a tubeless tire according to the first aspect has the shape of the bead-seating portion 11 curved inward to the spoke mounting wall 4 from the rim ear portion 7 to the hump portion 12 to enlarge a sealing area of a tire bead portion 38.

The embodiment of the present invention will be described in detail with references to FIGS. 1 to 6.

Figure 1:
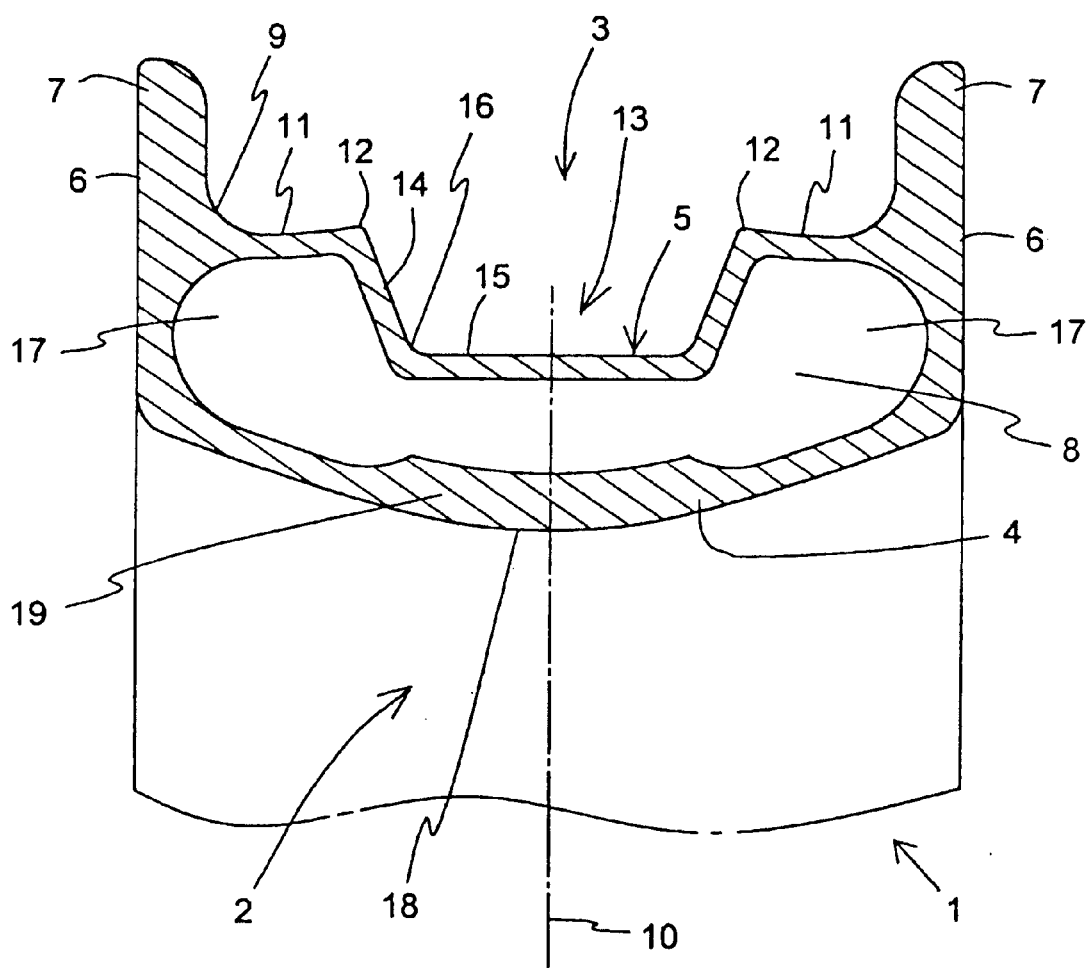
FIG. 1 is a sectional view showing a rim according to the present invention.

A rim 1 capable of mounting or fitting a wire-on (WO) type tubeless tire 37 according to an embodiment of the present invention comprises a rim in sectional shape shown in FIG. 1. In the section of the rim 1 shown in FIG. 1, suppose that the side on which the tubeless tire 37 is mounted is a rim outer side 3, and the side on which a hub is located is a rim inner side, the sectional shape of the rim comprises a spoke mounting wall 4 on the rim inner side 2, a diaphragm 5 on the rim outer side 3, left and right rim side walls 6, 6, and left and right ear portions 7, 7 standing upright from the rim side walls 6, 6 and extending toward the rim outer side 3. An internal region surrounded by the diaphragm 5 on the rim outer side 3, the left and right rim side walls 6, 6 and the spoke mounting wall 4 on the inner side 2 is formed into a hollow portion 8. The diaphragm 5 on the rim outer side 3 forms a bead-seating portion 11 extending substantially horizontally from an ear-rising portion 9 toward a rim center 10. A recess side wall 14 depends from a hump portion 12, i.e., an end closer to the rim center 10 of the bead-seating portion 11, on the obliquely downward rim side wall 6 side by about half the height of the hollow portion 8, and a recess bottom 15 extends horizontally in a direction of the rim center 10 to constitute the diaphragm 5 in symmetry of the rim center 10. That is, the rim center 10 of the diaphragm 5 is formed with a recess 13 in which a lateral width of the recess bottom 15 is approximately ⅓ of a lateral width of the rim, and there is a difference in level between the bead-seating portion 11 and the recess bottom 15 to form the diaphragm 5. In other words, in FIG. 1, the sectional shape of the rim is that of substantially U-shaped portions 17 comprising the bead-seating portion 11 on the rim outer side 3, the rim side walls 6, 6 of both left and right sides, and the spoke mounting wall 4 on the rim inner side 2 is symmetrical to the left and right in the rim section. The recess 13 is continuous and coexisting with the bead-seating portion 11 of the rim outer side 3 and is provided in the rim center 10. And the spoke-mounting wall 4 on the rim inner side 2 is formed below of the recess 13 being spaced therefrom by the hollow portion 8. On the other hand, the left and right side walls 6, 6 are formed with the ear portions 7, 7 which extend upward and within which the tire bead portions 38 are fitted.

The bead-seating portion 11 is a portion on which the tire bead 38 having a bead wire 39 of the tubeless tire 37 is placed when the WO type tubeless tire 37 is mounted on the rim 1 and filled with air. This bead-seating portion 11 is curved from the top area toward the bottom of the spoke mounting wall 4. An end closer to the rim center 10 of the bead-seated portion 11 forms a hump portion 12. The recess 13 recessed from the hump portion 12 is formed at a position of the rim center 10 and circumferentially of the rim 1. The hump portion 12 which forms also an upper end of the slightly inclined side wall 14 of the recess 13 slightly projects toward the rim outer side 3. The slightly projected hump portion 12 has a function to prevent the tire bead portion 38 of the tubeless tire 37 placed on the bead-seating portion 11 from falling into the recess 13.

The spoke-mounting wall 4 is formed, while depicting an arc slightly inflated toward the rim inner side 2, between the lower ends of the rim side walls 6, 6 below the left and right ear portions 7, 7 of the rim 1. The central portion of the body surface 18 of the spoke mounting wall 4 is formed in the thick-wall portion 19 in order the resist to tension of the mounted spoke 22. In the rim 1 shown in FIG. 1, the thick-wall portion 19 is formed toward the hollow portion 8 in the rim. Alternatively, the thick-wall portion 19 can be provided while being projected in the direction of the hub from the body surface 18, unlike the above-described embodiment.

Figure 2:
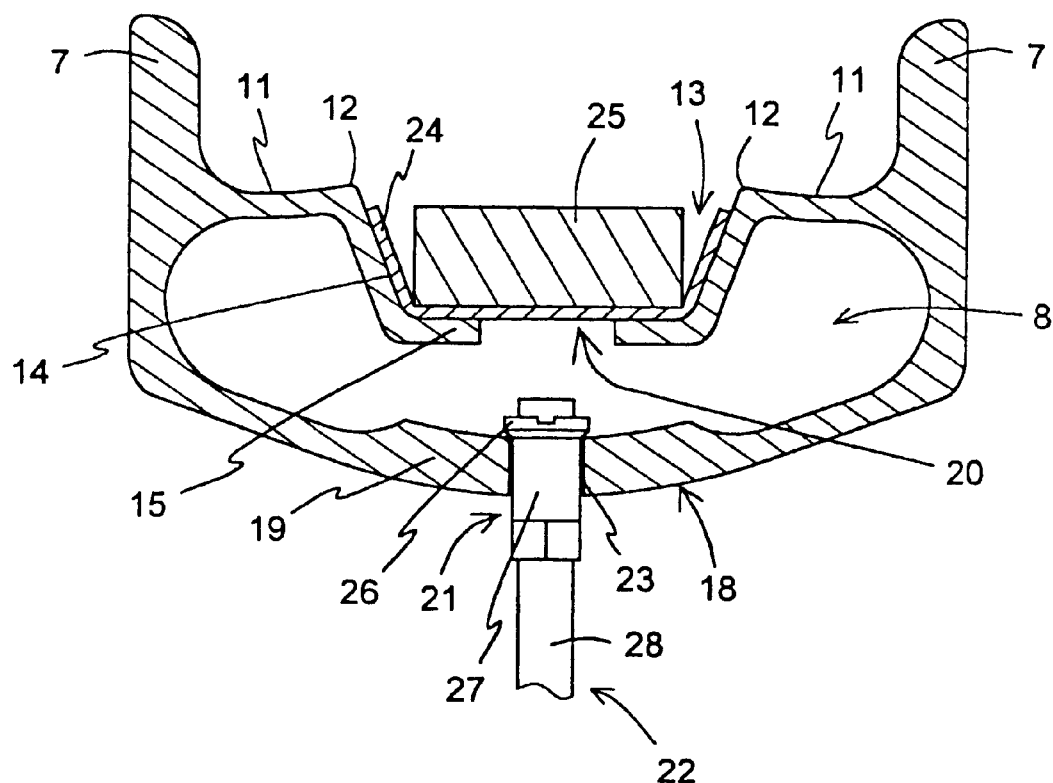
FIG. 2 is a sectional view of the rim in which a nipple and a spoke end are mounted in a hollow portion, and being sealed by a seal material and a foam.

As can be seen in FIG. 2, the body surface 18 of the spoke-mounting wall 4 on the rim inner side 2 is bored with a spoke mounting hole 23 in the form of a through-hole for inserting the spoke 22 through a nipple 21 at a suitable pitch at equal intervals in the peripheral direction of the rim. Further, the recess bottom 15 of the recess 13 formed in the diaphragm 5 on the rim outer side 3 is bored with a nipple hole 20 in the form of a through-hole for inserting the nipple 21. In the present embodiment, these through-holes bored in the recess bottom 15 of the recess 13 formed in the diaphragm 5 on the rim outer side 3 and the body surface 18 of the spoke mounting wall 4 are coaxially aligned, and a set of through-holes of the nipple hole 20 and the spoke-mounting hole 23 receives the nipple 21 and the spoke 22. Accordingly, the axes of one set of through-holes of the nipple hole 20 and the spoke-mounting hole 23 are inclined to be adapted to a degree of inclination of the spokes 22 extended from the hub. About a set of through-holes which are both nipple 20 and spoke-mounting holes 23, the size of nipple hole 20 located in the recess bottom 15 of the recess 13 formed in the diaphragm 5 on the rim outer side 3 is larger in diameter than that of the nipple head 26 and the size of spoke-mounting hole 23 is smaller in diameter than that of the nipple head 26 and is larger in diameter than that of a nipple shaft portion 27. Accordingly, when the nipple 21 is mounted on the rim 1, the nipple 21 is dropped and inserted into the spoke-mounting hole 23 bored in the body surface 18 of the spoke mounting wall from the nipple hole 20 bored in the recess bottom 15 to the recess 13. As a result, the nipple head 26 is placed on the annular wall of the spoke mounting hole 23 bored in the body surface 18 of the spoke mounting wall 4 in the hollow portion 8. Accordingly, when the spoke 22 is mounted, the nipple head 26 and the end 28 of the spoke 22 are received in the hollow portion 8 between the diaphragm 5 on the rim outer side 3 and the spoke-mounting wall 4.

On the rim outer side 3 of the recess bottom 15 of the recess 13 in which the nipple head 26 is inserted into the hollow portion 8, the nipple hole 20 of the recess bottom 15 is blocked and sealed by a seal material 24 of the metal tape which is slightly wider than the width of the recess bottom 15. The metal tape may be formed of an aluminum foil or a stainless steel foil and may have adhesives applied thereto, and the sides of the seal material 24 extending sideways from the recess bottom 15 are pasted to the left and right recess side walls 14, 14. While in the foregoing, the seal material 24 is formed of metal, it is to be noted that a high hardness elastomer other than metal can be used. Of course, the seal material 24 is preferably of a material having a high barrier property without being sunk into the nipple hole 20 under the internal pressure of a tire, and having a wall-thickness of not more than 2 mm. Preferably, the seal material 24 is thin due to the influence on the whole weight of a tire or the fitting of the extreme end of the tire bead portion 38 into the recess 13 when the tire is fitted.

Further, a plate-like foam 25, formed of urethane or rubber, having a thickness corresponding to substantially a depth or a height of the recess 13 and having a width of the recess 13 and which is elastic and soft is bonded by means of an adhesive to the upper surface of the tape-like seal material 24 on the recess bottom 15. The foam 25 has a width which covers not less than 90 percent of the width of the recess 13; that is, the width between the upper ends of the recess side walls 14, 14, and has a height which is not lower than not less than 2 mm from the height of the hump portion 12; that is, from the upper end of the recess side wall 14. The foam 25 has an open cell structure. When the width of the foam 25 is less than 90 percent of the recess 13, or lower than 2 mm, or more from the height of the hump portion 12, a clearance between the tire bead portion 38 and the foam 25 is large when the tire is fitted so that when air is filled, it is difficult to place the tire bead portion 38 on the bead-seating portion 11. Further, in the case in which the foam has a closed cell structure instead of open one, when the tubeless tire 38 is fitted, the foam 25 is more rigid, that is, the foam 25 is difficult to compress and the fitting is not easy.

Figure 3:
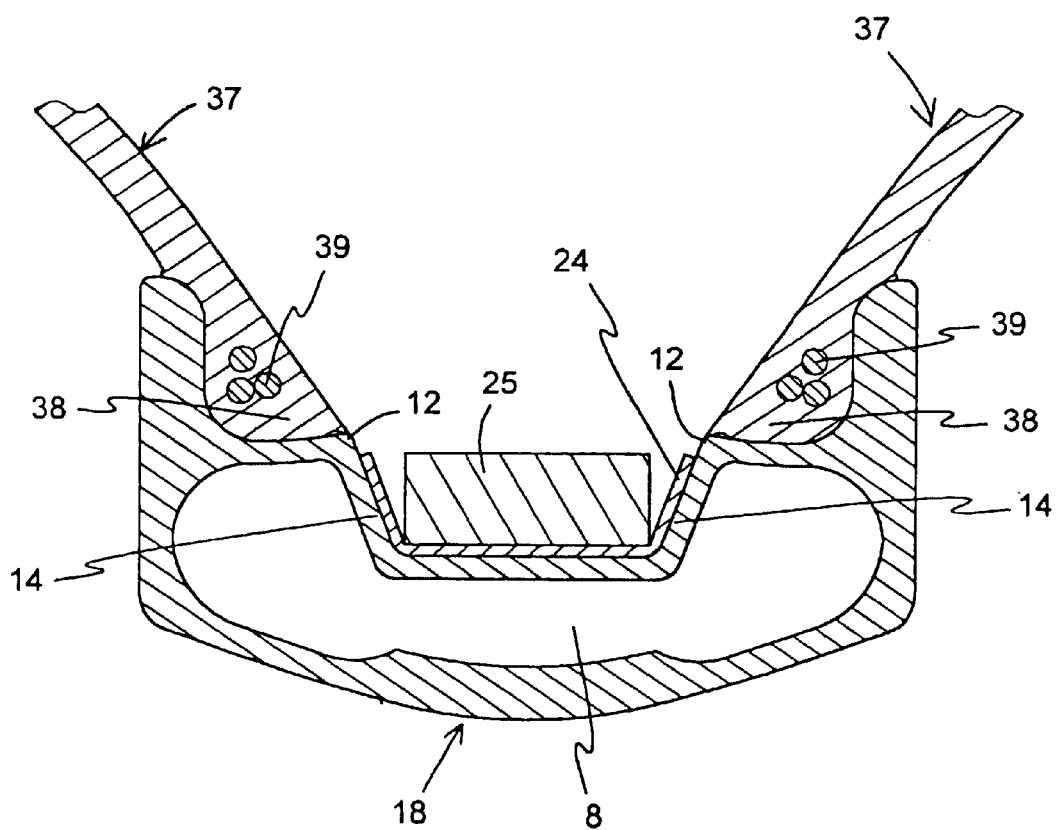
FIG. 3 is a sectional view of the rim being sealed by the seal material and the foam, in which a tire bead is fitted on a bead seat.

As can be seen in FIG. 3, the somewhat narrow tire bead portion 38 of the tubeless tire 37 fitted in the ear portion 7 of the rim 1 has a bead wire 39 therein and is inflated circumferentially outward and downward, and the inflated tire bead portion 38 is placed on the circumferentially curved bead-seating portion 11 of the diaphragm 5 of the rim 1.

Figure 4:
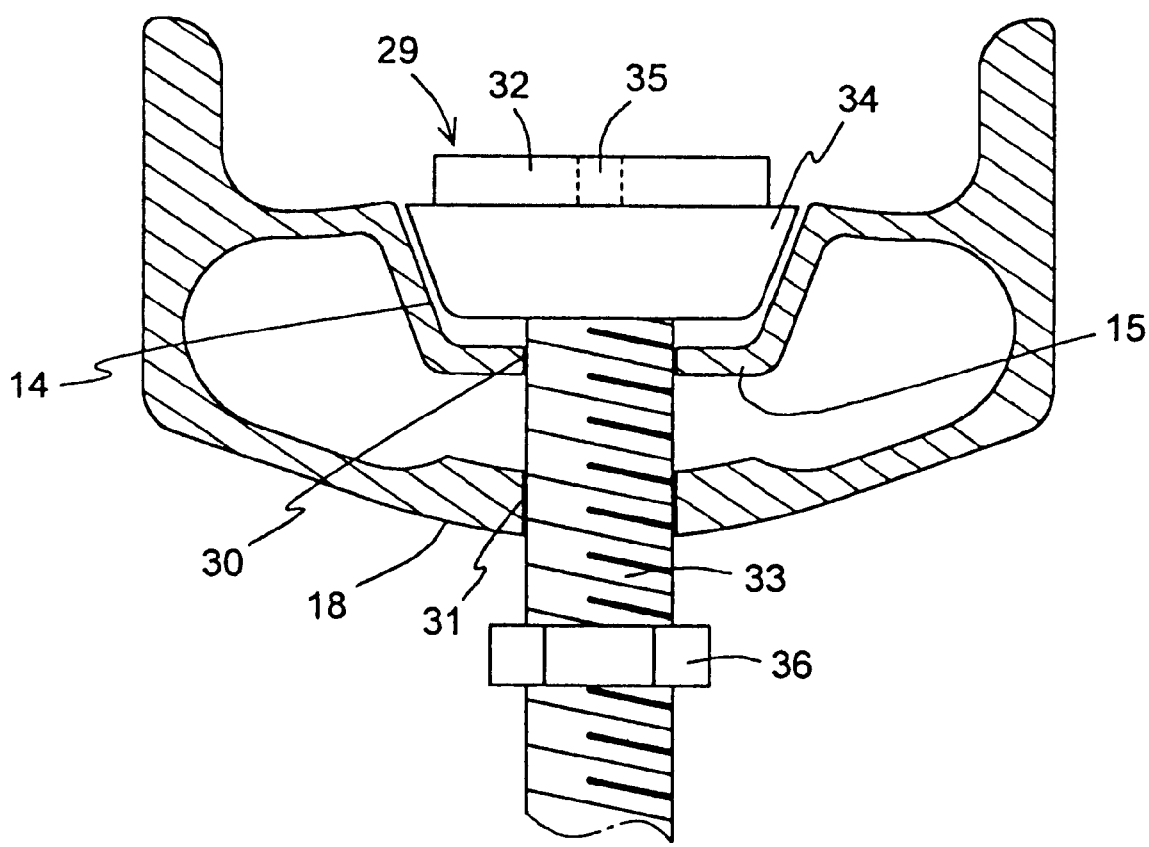
FIG. 4 is a sectional view explaining the state in which a valve is mounted on the rim.

As can be seen in FIG. 4, the valve 29 to inject air to the tubeless tire 37 consists of valve head 32 having an air fitting port 35 in its center, a plate-like packing 34 about the valve head 32 combined with elastic rubber or elastic plastic material or broader area than the bottom of valve head 32 and an axial valve body 33 having a thread formed on the cylindrical surface thereon, and the said valve 29 penetrates the rim 1. A nut 36 for fastening the spoke-mounting wall 4 from the rim inner side 2 is threadedly engaged with the thread of the valve body 33.

This valve 29 is provided internally of the recess 13 and is capable of being attached from the other side of the spoke-mounting wall 4 by means of the nut 36 when the valve is extended through the packing 34 formed of a rubber material or a plastic material. The valve body 33 extends through a valve hole 30 bored in the recess bottom 15 and a valve hole 31 bored in the body surface 18 of the spoke-mounting wall 4 coaxial with the valve hole 30. The valve body 33 projects toward the hub in the ring center of the rim 1. Further, the packing 34 is formed to have the same shape as the sectional shape of the recess 13 of the diaphragm 5 on the rim outer side 3, and a hole through which the valve body 33 passes extends through the center thereof.

In manufacturing the bicycle spoke rim wheel for a tubeless tire constructed as described above, first, a rim stock formed of extended extruded material made of a light alloy and having a sectional shape of the rim 1 is curved into a ring-like configuration while maintaining the shapes of the ear portion 7, the diaphragm 5 and the body surface 18 of the rim 1 by means of a roll. The rim stock is then cut into a fixed length as a wheel with the peripheral edge length along the bead-seating portion 11 being a reference, and the cut ends abutted and welded to obtain an endless ring-like rim 1.

Next, the head of each spoke 22 is inserted into, and engaged with, the spoke-mounting hole 23 of the hub. The thus inserted spoke being loose, the thread formed in the end 28 of the spoke 22 extends to the inside of the spoke-mounting hole 23 bored in the body surface 18 of the rim, and the nipple shaft portion 27 of the nipple 21 is inserted, from the side on the rim outer side 3, into the nipple hole 20 bored in the recess bottom 15 in the recess 13 of the diaphragm 5. The nipple head 26 is dropped into the hollow portion 8 with the nipple shaft portion 27 protruded from the spoke-mounting hole 23, and the thread of the end 28 of the spoke 22 is loosely tightened at the nipple shaft portion 27. The rim 1 is rotated to perform a similar operation, and the threads of the remaining spokes 22 are loosely tightened at the nipple shaft portion 27.

Figure 5:
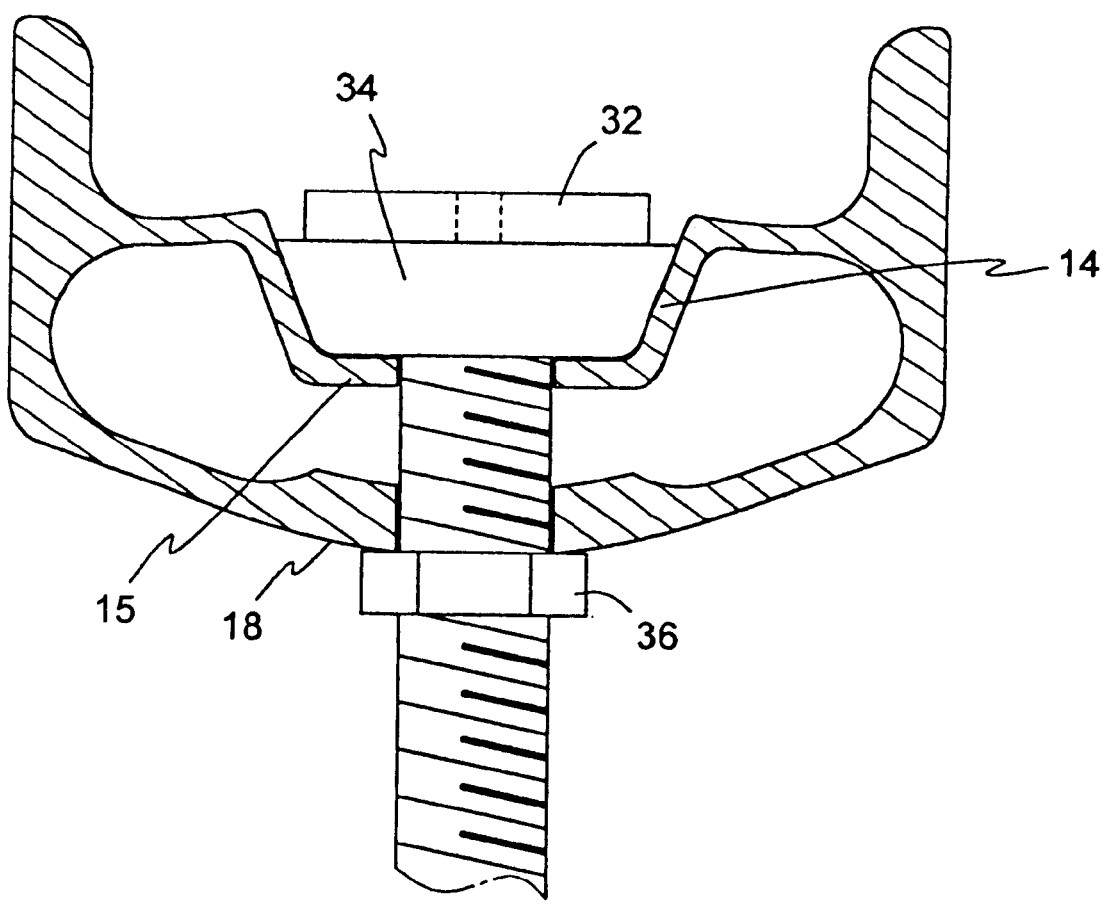
FIG. 5 is a sectional view explaining the state in which the valve is mounted on the rim and sealed.
Figure 6:
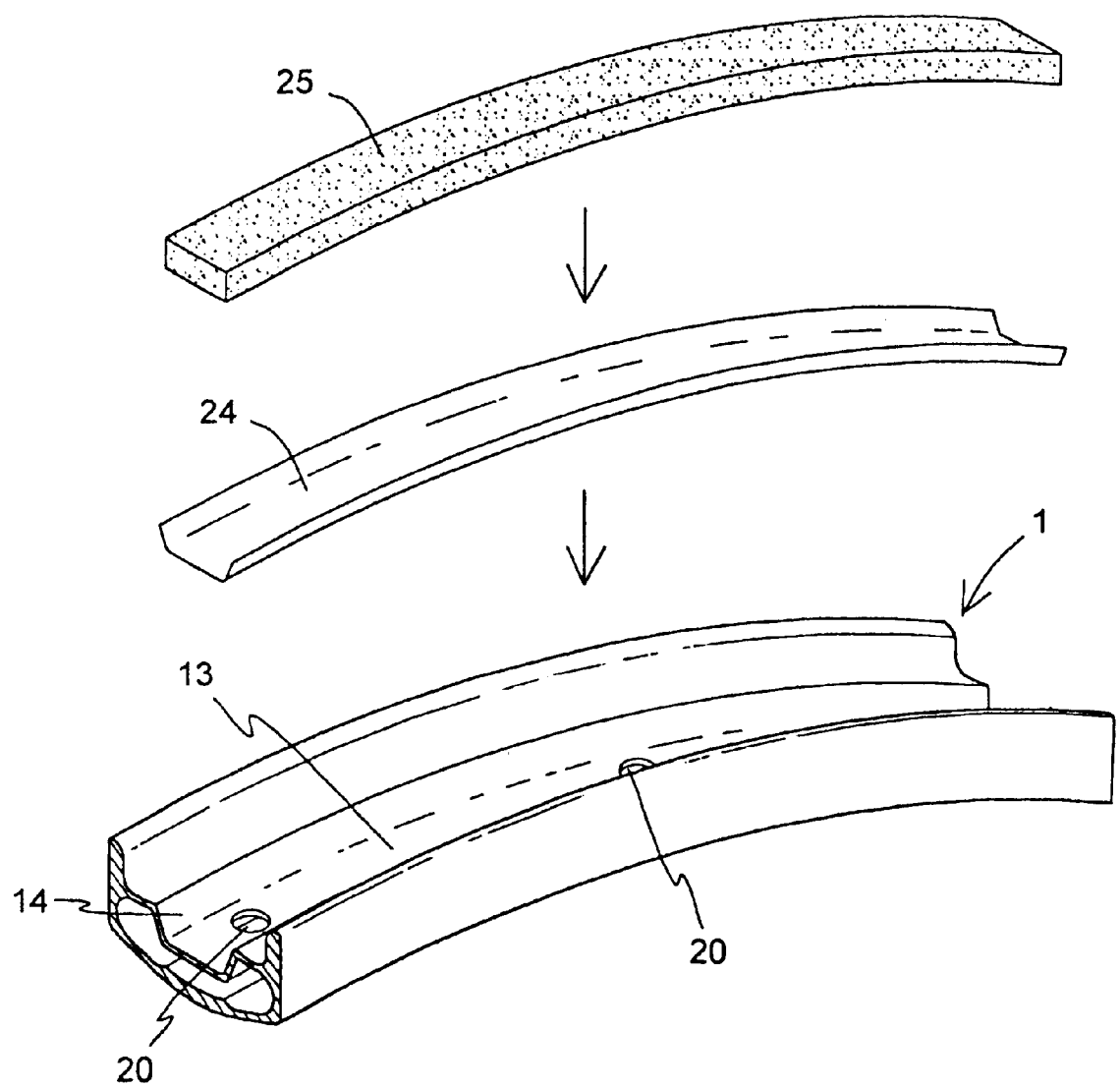
FIG. 6 is a perspective exploded view explaining a combination of the rim, the seal material, and the foam.

The spokes 22 and the nipple in the loosely tightened state are then finally tightened to complete the spoke tightening. Next, as shown in FIG. 4, the valve body 33 having the packing 34 inserted therethrough penetrates the valve hole 31 of the body surface 18 of the spoke-mounting wall 4 from the valve hole 30 of the recess 13. The valve head 32 is pressed on the recess bottom 15 side of the peripheral edge of the valve holes 30 to hold the packing 34 in the recess bottom 15, and the nut 36 is threadedly engaged with the valve body 33 projected from the body surface 18. The nut 36 is screwed to press the valve head 32 against the recess bottom 15, and the valve hole 30 of the recess 13 is closed by the packing 34 to complete sealing of the valve hole 30, as shown in FIG. 5. Next, as shown in FIG. 6, both left and right edges in the circumferential direction of the ring of the rim 1 of the packing 34 of the valve 29 are used as a start point and a terminal point, respectively, the tape-like seal material 24 formed of metal, for example, an aluminum foil, which is somewhat wider than the width of the recess bottom 15 of the recess 13 formed in the periphery of the ring is bonded to the entire peripheral region of the recess 13 over the recess side walls 14, 14 on both sides from the recess bottom 15 to seal all the nipple holes 20 formed at equal intervals in the recess bottom 15. Further, the plate-like foam 25 having the width of the recess bottom 15 and the depth of the recess 13, for example, a urethane foam, is bonded to the upper surface of the thus-bonded seal material 24 of the recess 13 by means of adhesives to complete the closure by way of blocking of the nipple holes 20 in the entire periphery of the ring of the rim.

Subsequently, the tubeless tire 37 is fitted in the rim 1, the tire bead portion 38 on one side of the tubeless tire 37 being placed on the foam 25, and the tire bead portion 38 on the other side then also placed on the foam 25. Both the tire bead portions 38, 38 press the foam 25 against the recess bottom 15, but the tire bead portions 38, 38 are to be positioned upward of the recess side walls 14, 14 of the recess 13 by the restoring force of the foam 25. In this state, finally air is filled in the tubeless tire 37 from the air filling port 35 of the valve 29 to thereby elevate air pressure in the tubeless tire 37, and by the elevation of the air pressure, the tire bead portions 38, 38 of the tubeless tire 37 are automatically moved in a lateral direction by the expansion thereof, and placed on the bead-seating portions 11, 11 to complete the bicycle spoke rim wheel for a tubeless tire.

As described above, the present invention provides a bicycle spoke rim wheel for a tubeless tire in which a region surrounding a diaphragm on the rim outer side, a rim side wall, and a spoke mounting wall on the rim inner side is formed into a hollow portion. A recess is formed in a center portion of the diaphragm. The diaphragm is of a two-stage construction so that the bead-seating portion on the upper stage is somewhat curved to slightly project a hump portion of the end thereof toward the rim outer side. A tape-like seal material such as a metal foil, is pasted to the recess bottom, and a plate-like foam, which has an elasticity and is soft, such as urethane foam, is further bonded onto the seal material. Thus the present invention exhibits the following effects:

(1) A conventional tubeless tire can be mounted on the bicycle spoke rim wheel.

(2) The spoke end projecting on the rim outer side and the nipple head are positioned within the hollow portion, and since these are not in contact with the seal material, the airtightness can be held positively without occurrence of breakage, deviation and peeling of the seal material.

(3) Since the foam is further bonded to the upper surface of the seal material bonded within the recess, the tire bead portion is not in direct contact with the seal material when the tubeless tire is fitted. Therefore, the breakage of the seal material caused by the tire bead portion is prevented so that the airtightness can be secured.

(4) Since the foam has an elasticity, is expansile and has a restoring force, in the case in which, when the tubeless tire is mounted on the rim, the tire bead portion on one side is first moved into the recess, the foam can be pressed and contracted to sink the tire bead portion in the vicinity of the recess bottom. Therefore, the other tire bead portion is very easily fitted in the rim, and workability of tire fitting is excellent.

(5) In the case in which, when the tubeless tire is fitted in the rim, both the tire bead portions are placed on the recess, the tire bead portions are raised up to the neighborhood of the upper end of the recess side wall by the restoring force of the foam. Therefore, when air is filled from the valve into the tubeless tire fitted in that state, the tire bead portions are easily placed on the bead-seated portion continuous to the ear portion of the diaphragm to provide complete fitting of the tire.

(6) The bead portion is formed into a circumferentially curved shape to enlarge a contact area between the bead-seating portion and the tire bead portion, that is, a sealing area. Therefore, even a tubeless tire having a thin, that is, narrow tire bead portion can fully secure airtightness, thus reducing the weight of the whole wheel.

(7) A thin metal tape is used as a seal material, and the seal material in the form of a metal tape and the fitting of the tire bead portion is facilitated as described above, whereby the light-weight foam and the light-weight vehicle can be obtained.

What is claimed is:

1. A bicycle spoke rim wheel for a tubeless tire of the wire-on type, the wheel comprising, symmetrical about a rim center (10), a spoke-mounting wall (4) on a rim inner side (2), a diaphragm (5) on a rim outer side (3), left and right rim side walls (6), and left and right ear portions (7) standing upright from the rim side walls (6) toward the rim outer side (3), wherein an internal region is surrounded by the diaphragm (5) on the rim outer side (3), the rim side walls (6), and the spoke-mounting wall (4) on the rim inner side (2) is formed into a hollow portion (8), the diaphragm (5) on the rim outer side (3) having, in symmetry with rim center (10), a bead-seating portion (11) extending substantially horizontally from left and right ear rising portions (9) toward a rim center (10), and a recess (13) recessed from a hump portion (12) closer to the rim center (10) of the bead-seating portion (11) to the spoke-mounting wall (4), a plurality of nipple holes (20) formed peripherally equidistantly in the recess (13), the spoke-mounting wall (4) being formed with a spoke-mounting hole (23) in alignment with each nipple hole (20) and into which a nipple (21) and a spoke end (28) are inserted, a nipple head (26) on the spoke-mounting wall (4) for mounting in the hollow portion (8) through the nipple hole (20) of the recess (13), a valve head (32) of a valve (29) for filling air into a tubeless tire (37) mounted on said rim wheel being disposed on the diaphragm (5) of the recess (13), a valve body (33) of said valve (29) being inserted into a valve hole (31) formed in the spoke-mounting wall (4), and having a nut (36) tightened thereto, said bicycle spoke rim wheel further comprising a tape-like seal material (24) pasted to the diaphragm (5) of the recess (13) to sell the nipple holes (20) provided in said recess (13), a plate-like resilient foam (25) having a width and height substantially coincident with a width of a bottom (15) of the recess (13) and with a height thereof pasted on said tape-like seal material (24) of the recess (13), a resilient packing (34) disposed between the valve head (32) and the peripheral wall of the valve hole (30) of the recess (13) to press the valve head (32) against the diaphragm (5) of the recess (13) so as to make the valve hole (30) airtight.

2. The bicycle spoke rim wheel for a tubeless tire according to claim 1, wherein a shape of the bead-seating portion (11) is curved inward to the spoke-mounting wall (4) from the rim ear portion (7) to the hump portion (12) to enlarge a sealing area of a tire bead portion (38).

3. The bicycle spoke rim wheel for a tubeless tire according to claim 1 wherein said resilient foam (25) has an open cell structure.

* * * * *